United States Patent
Tsiyoni (10) Patent No.: US 8,359,230 B2
(45) Date of Patent: Jan. 22, 2013

(54) INTERNET TRADING

(76) Inventor: Joseph Tsiyoni, Tempe, AZ (US)

( * ) Notice: Subject to any disclaimer, the term of this patent is extended or adjusted under 35 U.S.C. 154(b) by 725 days.

(21) Appl. No.: 12/319,323

(22) Filed: Jan. 6, 2009

(65) Prior Publication Data

US 2009/0182632 A1   Jul. 16, 2009

Related U.S. Application Data (60) Provisional application No. 61/010,905, filed on Jan. 14, 2008.

(51) Int. Cl.
*G06Q 30/00* (2012.01)
(52) U.S. Cl. .................................................. 705/14.1
(58) Field of Classification Search ............... 705/14, 705/26, 37, 14.1
See application file for complete search history.

(56) References Cited

U.S. PATENT DOCUMENTS

| | | | |
|---|---|---|---|
| 5,890,138 A | 3/1999 | Godin et al. | |
| 6,266,652 B1 | 7/2001 | Godin et al. | |
| 6,598,026 B1 | 7/2003 | Ojha et al. | |
| 6,647,373 B1 | 11/2003 | Carlton-Foss | |
| 7,376,593 B2 | 5/2008 | Schulze | |
| 7,392,215 B1* | 6/2008 | Bril | 705/37 |
| 7,440,912 B2 | 10/2008 | Asher et al. | |
| 7,472,076 B2* | 12/2008 | Garg et al. | 705/26.3 |
| 2006/0085318 A1 | 4/2006 | Cohoon | |
| 2006/0122928 A1 | 6/2006 | Gram | |
| 2006/0136324 A1 | 6/2006 | Barry et al. | |
| 2006/0200401 A1* | 9/2006 | Lisani et al. | 705/37 |
| 2006/0247984 A1* | 11/2006 | Shaw | 705/28 |
| 2006/0253366 A1 | 11/2006 | Rebibo | |
| 2007/0083437 A1* | 4/2007 | Hamor | 705/26 |
| 2007/0271148 A1 | 11/2007 | Kapenda | |
| 2008/0103852 A1 | 5/2008 | Byde | |
| 2008/0162330 A1 | 7/2008 | Atkinson et al. | |
| 2008/0172294 A1 | 7/2008 | McGuire | |
| 2009/0030833 A1 | 1/2009 | Leung | |

* cited by examiner

*Primary Examiner* — Daniel Lastra (57) ABSTRACT

A new internet trading method, concept and process is introduced, enabling users to post goods and services for sale and purchasing, whereby the posted price begins at its maximum, and thereafter is gradually reduced to a minimum, pre-selected price, based on pre-programmed methods and programs, according to a pre-selected schedule of price reduction based on frequencies and sequences of amounts of time, money and percentage, respectively.

The new process provides sets of pre-programmed price reduction schedules which may be prepared by the seller, or selected from a pool of sets, or randomly selected from the system, thereby, at every certain amount of pre-selected times, the maximum price of such goods or services is reduced by certain amount of money, or percentage, respectively to the maximum price initially posted during the duration of the sale, enabling a prospective buyer to 'grab' (purchase) the item by placing an offer at any given time, for the posted price at that time, thereby instantly purchasing the product or service, thus also, instantly, ending the sale.

21 Claims, 3 Drawing Sheets

INTERNET TRADING

CROSS-REFERENCE TO RELATED APPLICATION

The current application claims priority to prior filed application Ser. No. 61/010,905, entitled Gradual Price Reduction Internet Sales, Purchasing and Reverse Auction, filed Jan. 14, 2008.

BACKGROUND OF THE INVENTION

1. Field of the Invention

The current invention relates to sales and marketing. More particularly, the invention concerns internet trading, sales and purchasing. In a further and more specific aspect, the invention concerns sales of general merchandise products, goods and services by posting such on sale on the internet in a new method.

2. The Prior Art

The prior are has provided numerous methods of internet trading, some subject to numerous patents. As the World Wide Web significantly advances, people all over the world spend billions of dollars annually to purchase goods and services via the internet by all means offered. As such, numerous methods have been developed, offering variety of auction-type trading, most under numerous U.S. Patents. The most common, and the most used method is known as "Internet Auction".

More specifically, as "auction" became critical in this field, it is appropriate to realize the publically accepted definition of the term "auction" by two major dictionaries:

Wikipedia: "An auction is a process of buying and selling goods or services by offering them up for bid, taking bids, and then selling the item to the winning bidder."

Webster: "The selling of goods where people offer bids, and the item is sold to the person who makes the highest offer"

In the classical and practical definition of the internet auction system, a vendor posts an item or a service at a specific price, for a specific period of time, hopping to sale it for a much higher price to the highest bidder, in a process whereby expected multi bidders and potential buyers submit their bids at a higher rate from the recent, so that at the end of the duration of the auction, the highest bidder wins the auction. As such, most, if not all, of the methods developed in this regards, including those under patents right related to variety of auctions, (by such definitions), some of which are commercial transactions, some for hotels, air fair, to name some.

The following are the most used internet auctions: Best Offer, Private Auction, Multiple Item Auction, Buy It Now, Reverse Auction. In general, all these types of internet trading can be considered conventional auctions, as the definitions show, and as it has been done practically.

That means goods and services are posted in the internet for sale at a specific price, with the intention to end up selling it for the highest bidder at a much higher price, whereby the highest bidder wins the bid only at the end of the auction.

Some of the major areas of internet trading in the mean of auctions are the general merchandise, services, federal GSA auctions, antique auctions, collectible auctions, auto auction, surplus, liquidation and specific purpose auctions.

The following are examples of some known, common trading companies, who provide internet auctions for goods and services:

Bidz.com, Ebay.com, eBid.Net, gsaauctions.gov, ww.auction.com www.auction.com, www.GovernmentAuctions.org, www.inetbid.com, www.internetauctionlist.com, www.shoper.com, www.squeagle.com, www.ubid.com, www.ushomeauction.com and www.webidz.com (an Ebay alternative auction site), However, these are all auctions, by the definitions of "auction', and by practice. Although numerous patents have been issued for the general area of 'auctions', disadvantage of the current auction methods keep increasing.

One drawback of the above types of auctions is the decrease in the ideal means of 'auction', leading to many to become merely stores for goods and services, such as Amazon.com™ for books. In that respect, even Ebay.com™ is partially such as store by using "But It Now". It is a fact that less and less auctions ending without buyers, or with products sold for the initial starting price. This tendency continues to affect the current internet trading via those methods of auctions.

In fact, even if a good or service has been sold, no statistics can prove the percentage of items or services sold at a higher price than the initially posted price; and, if higher, by which amount. Thus, it appears that the ideal method and intention of 'auction' on its many varieties is becoming somehow close to obsolete, or, at least, losing its significance, with continuing reduction.

Further drawback of the current auction types is that the World Wide Web system has become sophisticated to the extend, also based on numerous patents, that a shopper can find the lowest price of a product or service quickly, thus buying the same directly from web sellers. In addition, the obtained information enables the prospective shopper to submit a bid according to his or her research, or avoiding an auction because the posted price is higher than the price obtained through the search.

Yet it is another drawback of the current auctions because of the duration of the auctions. The average period for each auction is seven (7) days, while two more periods are normally used: Three (3) days (least used), and Ten (10) days, which is even 'worse'. In the current dynamic market, shoppers are too eager to complete a purchase almost instantly. Thus, waiting between seven to ten days to the end of an auction seems to many as taken forever.

A further drawback of the current auction methods is the time consuming a bidder needs to spend in addition to the first submission of a bid. A bidder must follow the auction for many days, whereby the need to submit more offers, always in higher amounts, is necessary when the bidder is outbid. What seemed to be an exciting process of repeated bids, competing with others, has become, in today's dynamic market, a frustrating process, less exciting, and much discouraging.

To make it even worse, if the auctioneer submits a notice to each outbid bidder, a growing practice, then the bidder has to deal with yet another 'junk mail' type of emails.

Thus, a good idea has become a nightmare to many, because of today's high volume of email many receive.

Despite the fact that still many people use the internet auction to sell goods and services, many are discouraged because the relatively low price bidders offer, in general, resulting in many auctions ending with less revenue.

In addition, it is obvious that in today's dynamic markets, and buyers being eager to receive the goods or services as soon as possible, instant winning has become a world-wide desire of many buyers, which the current auction methods does not offer.

It is yet another and further drawback of the current auction methods by losing the attraction and excitement of auction. It is known that public auction whereby people gather and submit bids instantly, publically, in fraction of a second, are very attractive and exciting, such as luxury vehicles, auto auctions and used or new general merchandise. By all means, internet auction attraction and excitement have either gone, or are being significantly reduced.

Thus, it is fair to state that, due to the reduction in the ideal meaning, definition and purpose of 'auction', 'internet auction' has become merely a method of selling a product, mostly for the starting price, or for a price much lower than the expected price.

Referring now to another method of internet auction, it is known as 'low price internet shopping'. In this method, the prospective buyers search multi web sites for the lowest price for the product or service. For example, www.pricewatch.com, which supposedly suggests multiple items or services of the same nature for the lowest price on the internet. See also www.shopper.com. This method is acceptable, but is different than the "regular" auctions. It is merely search for a low price, mostly for services.

To extend this subject, it should be mentioned that another method of internet trading has been in use know as "buyer's price". In this method, mostly used by companies, buyers counter a suggested price by offering a lower price, which may be negotiate and re-countered by the offerror until the "negotiation" ends with or without a sale. For example, to get a hotel room via www.priceline.com, the customer may counter a set price and receive a notice of a better price, then accept the offer and purchase the room at the hotel. This method has specific and limited usage, and may be extremely frustrating and time consuming.

A further variation of the auction process provides a two-phase process of 'reverse auction', initiated in the country of Holland for selling flowers. In reverse auction process, the first phase is with the determination of the most favorable price available for the same item or service using search engines for multi vendors. In the second phase, the process negotiates a price which is lower than the most favorable lower price at the same time, by soliciting bids from the vendors. While the idea is good, this is a long lasting process, whereby the prospective buyer may "get lost", and misses its concentration and get even more confused in the extremely dynamic internet shopping world. In fact, other than patent registration, it may have not been practical at all.

In addition, the current 'reverse auction' provides a method of submission of a plurality of bids, proposals, whereby a computer network enabling communication between a host computer and a plurality of remote bidders. As such, this becomes a unique auction for plurality of potential buyers under certain rules and data provided and specific terms and conditions, thus much differs from the invention presented herein.

Above all, in a way of example only, practically, the term "auction" had lost its main purpose—also by definition—to achieve a higher price for a posted product or service. In lack of scientific study, it is difficult to accept or deny such argument, but the reality is that, mostly, 'internet auctions' means boring 'internet stores'.

It should be noted again that using most current methods of auctions are almost the same of having web shops for internet trading. Thus, these auctions sales are distinguished from 'regular web sales', or 'web stores' by calling them 'suctions'.

Therefore, being distinguished from 'auctions', and in many aspect being superior, and based on the foregoing, the invention presented here is the answer to all disadvantages, most which have been specified here.

Thus, despite the current volume of internet auctions, resulting from people's need to earn money, only auctions of unique items, such as luxury vehicles, motor vehicle and or collectible items, can be consider 'real auctions'. All other auction methods described here, have lost the practical meaning, are more boring and ending with less expected revenues.

Therefore, the invention presented here is revolutionary, exciting and serves as a perfect alternative method and solution to the current internet trading industry.

SUMMARY OF THE INVENTION

Since the internet trading market starves for a new method, a new challenge, a new process, and a new 'life' and excitement, especially in light of the disadvantages of the existing auction type internet trading, the invention presented here is the answer to the future internet trading for its innovative manner, excitement, and many advantages yet to be described Therefore, this new, revolutionary and innovative invention relates to a new concept, method, system and process for internet trading, sales and purchasing (shopping) of goods and services (general merchandise products). In its principle, unlike other trades, the initial price for the goods and services is posted at the highest desired price by the seller, and thereafter gradually, and electronically, is reduced, at least one time, based on units of time, money and percentage, during the duration of a sale.

The new invention consists of all necessary programs, software, hardware and applications to operate an internet trading. For example, the new invention consists of a complete Computer system with all necessary software, hardware and numerous programs, some to be described in more details later, a complete web site, the necessary data for all purposes, including for registration, maintaining database and trade information, various forms, maintenance forms, notices, applications, registrations forms, terms of use, user's help information, communications software, support section and instructions, feedback, contacts, and such and further elements needed to operate internet trading.

In this invention, unlike the known auctions, during the duration of the sale, at least once, but preferably multiple times, the price of the product or service is electronically and automatically reduced.

The reduction is relative to the initially posted highest price, and each time the new price is lower than the initially posted maximum price, and each such time lower than the immediate previous price. Therefore the prospective buyer is enable to instantly make a purchase, at any given real time, which instantly completes the purchase and instantly ends the sale. The buyer is therefore instantly granted the purchase. On the other hand, If, during the duration of the sale, but before the end, no offer has been submitted, said price will then be automatically posted at the last unit of time, at its lowest acceptable, pre-selected price by the seller, whereby prospective buyers will still have opportunities to purchase the good or service at its lowest price.

Note that technically, a buyer may think by waiting longer he or she can get the item for a lower price. However, this is exactly one of the attraction and advantages of the new invention. It is because waiting longer, someone else may 'grab' (purchase) the item for additional few cents or a few dollars. It is the opposite, same buyer, according to this concept, may 'grab' the item just because of the same reason, in order not to lose it for a few pennies.

Thus, in general, the preferred embodiment provides a gradual price reduction internet trading, unlike auctions, whereby all posted prices are known only to the seller, thereby unexpected or unpredicted by the buyers during the duration of the sale.

It is therefore yet another advantage of the new invention to enable buyers to participate in an internet trading, by selecting goods or services at an attractive price, and 'grabbing' it, as a final purchase, without further waiting time or submission.

Accordingly, it is yet another advantage of the present invention that the purchaser does not have to follow-up with other bidders, and does not have to adjust himself or herself to the time dictated by the vendor to end the auction. Also, it saves time and energy currently requested to follow-up and re-enter a bid when other offer is higher even by a very small amount.

Most importantly, here, the purchaser decides the proper price he or she is willing to pay for such good or service, and all it talks to purchase it is a single click on the keyboard.

Thus, a further advantage of this invention is that it offers multi prices, from the highest to the lowest for each sale. These may be one more price, or, preferably a series of prices, which no other method offers, thereby buyers have a large range of prices to select from.

Yet it is another advantage of the present invention that only the vendor (seller) knows the lowest price, or the set of gradual price reduction. Also, the prospective buyer is the one to decides when, and at which lower price he or she should purchase the item, as the price continues to be reduced. In such, it is in the buyer's mind missing the opportunity if not acting immediately to purchase the good or service at a posted price at a real given time, because it could be grabbed by someone else.

A further advantage of the invention presented here is that it enables the prospective buyers to purchase goods and services at a lower price than the posted price, instantly, due to an automatic gradual reduction system being applied.

It is yet another advantage of the present invention that the process is based on a pre-programmed, pre-selected of at least one set of gradual price reduction, based on units of time, amount of money and percentage.

In another, and additional advantage of this new invention, the system is designed to enable the user at least one system, but preferably multi systems of sets of gradual price reduction.

To demonstrate the significance and the flexibility of this system, at least one method of gradual price reduction is used. However, in a way of example, the following three methods, or plans of gradual price reduction are given. These methods and plans enabling the seller to select its most favorable gradual price reduction set. Before introducing the examples, please note the principle of the gradual price reduction method.

The seller decides, and thus selects a maximum (highest) initial price to be posted first (as oppose to other methods of internet trading and auctions), whereby such price would eventually be reasonable and based on the sellers judgment and knowledge of the market. The sellers also selects a lower, minimum price he or she will be willing to accept at the end of the sale, if the good or service was not sold before the end of the duration of the sale. For example, a starting, maximum (highest) price for a GPS selected by the seller at $190, and the minimum price is selected as $130. For the purpose of this invention and example, the range of price reduction therefore is between $190 to $130 (=$60), known to the seller only.

Having the range of gradual price reduction set, the sells knows now that during the duration of the sale, such as 3, or 7 or 10 days, as some examples, the reduction range will be split over that period by amounts of time, money and/or percentage. To clarify this, suppose that for a 3-day sale, each day the price is reduced by the following sequence:

Beginning price: $190. After one day (24 hours)—the price is posted as $165, then, during the last ($3^{rd}$) day, at $130. The last day here is considered as the "last unit of time", which happened to be one (1) day, but which may be any amount of time. This will be discussed in more details later.

Using the same example, if the reduction schedule is by hours, it could be changed as follows: Beginning price: $190; then $180 after 10 hours, then $175 after 24 hours, then $165 after 48 hours, then $150 after 60 hours, then $140 after 66 hours, then $130 for the remaining 12 hours (to complete 3-day (72 hours) sale.

Thus, this very principle is used in this invention, and now demonstrated in three examples of methods, or plans, designed for this invention.

Therefore, while the principle of this invention is using a pre-selected set of gradual price reduction consists of at least one lower price than the maximum initially posted price, and a lowest price, to be posted at the last unit time of the sale, three methods, or plans, show the extreme flexibility and innovative manner of this invention, whereby:

a. Random Gradual Price Reduction set/plan, consisting of at least one set of gradual price reduction, each one posted upon a pre-programmed schedule based on amounts of time, money and percentage, wherein the first and initial price posted for each sale is the highest (maximum) price input by the seller, and the last posted price is the lowest price also input by the seller, whereby one or more prices, each one lower than the initially posted highest price, but higher than the lowest price, all pre-programmed. Each price is also lower than the immediately recent posted price, at pre-programmed sequence and frequency. It is possible, and preferred, that such each sets of gradual price reduction consists of multiple prices based on said principle. Thus, the system can randomly select different sets, each has different lower prices posted at different frequency and percentage.

b. Gradual Price Reduction Pool. This is a pool of at least one set, but preferably multi sets, of plans of random price reduction based on units of time, money and percentage. Each set is similar in nature and principle to the set included in the random method.

In this example, the first and initial price posted for each sale is the highest (maximum) price input by the seller, and the last posted price is the lowest price also input by the seller, whereby one or more prices, each one lower than the initially posted highest price, but higher than the lowest price, all pre-programmed; each is also lower than the immediately recent posted price, at pre-programmed sequence and frequency. It is possible, and preferred, that such each sets of gradual price reduction consists of multiple prices based on said principle.

Thus, the system can randomly select different sets, each has different lower prices posted at different frequency and percentage.

Thus, soon as the seller inputs the highest and lowest price, the system determines the range of the price reduction, and offers the seller to select one set to apply for the sale.

c. Self-Created Set: The present invention includes data and programs which enables the seller to create his or her own set of gradual price reduction based on any of five major elements of this invention: Highest price, lowest price (=the range of reduction), and amounts of time, money and, in the alternative, amount of percentage. After entering the highest and lowest amounts to be posted at the beginning and at the end of the sale, respectively, the programs calculates the range of reduction. The seller than input information of his desire for the amount of price reduction (at least one), the frequency of price change (by minutes, hours, day, or combination), and, whenever applicable, by percentage from the highest posted price. These last three elements are explained in detail on the next page.

Thereafter, the program generates one specific set of gradual price reduction, whereby the seller may select or modify. Either way, upon selection, the highest selected price will be posted at the beginning of the sale, and the lowest price will be posted at the last unit of time toward the end of the duration of the sale.

The three examples show how sets of gradual price reduction may be selected. It is now important to explain the issues of three important elements which are also part of the invention presented here, thereby part of each set of such reduction plan.

Therefore, in clarifying the elements of 'time', 'money' and 'percentage', as some of the major elements of the gradual reduction methods, these are best described as follows:

a. Time: This includes at least one minute, but may be several minutes, or one hour, or hours, or any fraction of an hour, a day or a few days, or any combination of any of these.
b. Money: Including at least one penny, but more likely larger amount of money, which may be amounts equal to several pennies, dime or dimes, quarter or quarters, dollar or dollars, or any fraction of a dollar, and/or any combination of any of these.
c. Percentage: Here, that is percentage (from the initial posted price), which is eventually transferred into amount of money as previously defined and described. Thus, 'percentage' represents, for this invention, a percent amount of gradual reduction, which continues to be calculated by the system and interpreted into amounts of money during the duration of the sale.

To demonstrate the usage of such combined examples of the method of set selection and these terms of money, time and percentage, examples are provided later below.

Therefore, as the present invention offers a method and process which also challenges other elements of current internet trading. While all methods in form of 'auction' dominant the internet trading market, the new invention is an internet trading which looks like 'auction', but is significantly, basically and in principle different, and, in many aspect, superior.

Naming yet another advantage of this new invention, it also responds to the 'reverse auction' method, which has been subject to a few patents. It overcomes the limitation of the 'reverse auction', which applies to its concept of a process which "negotiates a sale price lower than the most favorable advertised price by soliciting bids from multiple vendors of the item".

Thus, the concept presented here, is different than the reverse auction concept and operation by overcoming the disadvantages where the buyer "locates and purchase goods or services at an optimal price" which is determined by electronic search, which may not be realistic at the time a seller posts its good or service according to this new invention.

In fact, in addition to the advantages over the 'reverse auction', the latter being simply another auction. Yet another advantages of the present invention advantages over the reverse auction is that reverse auction suggests a negative impact, using the lowest amount for the good or service proven by using its own language: "the amount is lower than the lowest market price", and the price "is significantly lower than the cost for the same item obtained using other methods".

Therefore, one unique aspect of the invention presented here is that it presents a package of advantages over the existing methods of internet auctions, whereby the new spirit and excitement will serve to the benefits of both sellers and buyers, whereby goods and services will be 'grabbed' instantly to the best satisfaction of both sides.

Turning now into more specific and detailed summary of this new invention, the uniqueness of the present invention is now described by way of example.

Accordingly, in one aspect of the present invention, the gradual reduction process provided is based on several steps or phases. Prior to making the process available, the provider of such internet trade services, based on this invention, establishes its own program, software, hardware, and all other necessary elements to execute the program.

Among other things, the server uses at least one special program to create data base to establish at least one set of gradual price reduction based on units of money, time and percentage. Having these ready, and in mind the previous three examples of selecting sets of gradual price reduction, following are the major steps of this process:

1. Step One

At the first step, the system provides at least one set of pre-programmed gradual price reduction, but most likely more, to enable the seller variety of selections. Examples of three pre-programmed sets, previously specified in details, are:

i. Random Gradual Price Reduction
ii. Gradual Price Reduction Pool
iii. Self-Created Set.

After proper registration, a seller selects one of these three multi-sets methods, all pre-programmed, to apply for the good or service sale. Each set, whether pre-programmed, or automatically selected, contains at least one formula to calculate the gradual price reduction based on the data input by the seller.

The data to create such formula includes:
a. Posting a price, initial highest desired for the good or service, at the beginning of the sale. The price will be selected by the seller based on his or her discretion, eventually as a realistic and attractive price. Either way, the price will be continuingly reduced later during the duration of the sale.
b. The lowest price for such item, to be posted at the last unit of time of the duration of the sale. For example, based on the definition of 'time' in this specification, the last time unit may be the last two (2) hours of the sale. Thus, as a hypothetic example of an item begun with the price of $50, during the last two hours of the sale, the price will be reduced to $33, as the last reduction.
c. Frequency of price reduction posting. That is at least one unit of time, thereafter the Initial posting, for a reduced price yet to be determined below. The pre-programmed set or sets of such methods are designed to offer variety of frequencies, to spread the total amount to be reduced over the duration of the sale.
   The following demonstrates, by way of example, a scenario of units of time set in one hypothetic sale for the duration of seven (7) days:
   Starting from the first hour of the posting, 4 hours, then 4 hours, then 4 hours, then 4 hours, then every 2 hours for two days, then 3 hours, 6 hours, 3 hours, 4 hours, 2 hours, and so far, until the last two hours, which will be the last time unit for such sale.
d. Unit(s) of money. Following the example of section c (units of time), a unit of amounts of money to be posted each time as a lower price than the previously posted, so that the last amount will be the minimum (lowest) posted.

The following demonstrates, by way of example, a scenario of units of time used in one hypothetic sale for the duration of seven (7) days:

Initial price: $50, for the first 6 hours;
$2 reduction every 6 hours for 18 hours=$48; $46; $44 [after 24 hours)
$1 reduction every 6 hours, for 24 hours=$43, $42; $41: $40 (after 2 days)
$0.75 reduction every 6 hours for 2 days=$39.25; $38.50; $37.75; $37; $36.25; $35.50; $34.75; $34 (After 4 days)
"0" reduction for 1 day=Price remains $34 (after 5 days).
$1.50 reduction every 8 hours for 24 hours=$32.5; $31; $29.5; $28;
$0.50 every 6 hours for the remaining 24 hours=$27.50; $27; $26.50; $26;

In this example, if the item was not 'grabbed' (purchased) during the 6 days and 18 hours, the posted price during the last 6 hours, the posted reduced price will be $26 e. Percentages. As yet another method of decreased price, pre-programmed, or by the selection of the seller, 'percentage' method may be used to determine the gradual price reduction, in the same principle and manner already described.

Thus, using the same method of pre-programmed gradual price reduction sets, the selected percentage reduction of a price, relative to the initially, highest ported price will be interpreted into amount of money, per the following example:

With a starting posted price of $100, during the first 24 hours, the price will be reduced by 2% every 6 hours, resulting in this 24 hours schedule of price reduction: Starting price: $100, for the first 6 hours; After 6 hours to 12 hours: $98; After 8 hours, (from 12-18): $96; Between 18 hours and 24 hours: $94 (one-day example).

2. Step Two: Sale Duration

The trade starts at a specific time and price selected by the seller. After that, the price keeps being reduced. The price will continue to decrease as long as no purchase has been made, toward the end of the duration of the sale, then the lowest, final price will be posted for the last unit of time. As stated, the gradual price reduction will be according to the pre-selected, or random set selected.

3. Step Three: Possible Purchase

At any given, real time, during the duration of the sale, any registered buyer may make a purchase by accepting the posted price by a punch of a key on the keyboard. Immediately when the buyer makes a purchase, the computer generates notices for purchasing and sale conformation to the parties, thus ending the sale instantly.

4. Step Four: Termination or Execution of Sales

Immediately upon a purchase, or at the end of the duration of the sale, if the sale ended with no buyer accepting the (lowest) price, the sale ends, and the seller has two choices:

1. To terminate the sale for good; or
2. To re-post the same item: the seller starts over with his choices of electing the same, or a different, desired set of gradual price reduction.

Either way, proper notices are sent to the appropriate parties, and the automated computer program competes the closing of that sale, with, or without a purchase.

The following is another example to demonstrates one posting based on this invention. Here, a book is offered for the amount of $20 for a period of five (5) days, based on gradual price reduction, the heart of this invention:

1. Every two hours, $1^{st}$ day: The posted price will be reduced by 10 cents each hour for one day. Thus, if not sold, the price will be $20−$2.40=$17.60 at the end of the first 24 hours ($1^{st}$ day).

2. Starting the 2nd day ($25^{th}$ hour), the reduction will be 25 cents every 4 hours, for 24 hours. If not sold, the price becomes changes as follows:
$17.60−(6×$0.25=$1.50)=$16.10
3. 3rd Day: 10 cents reduction every 2 hours (for 24 hours) (12×$0.10=$1.20);
$16.10−$1.20=$14.90
4. 4th Day: $0.5 (50 cents) reduction every 6 hours=$14.90− $2=$12.90
5. 5th day=$0.20 reduction every four hours=$12.90− $1.20=$11.700
6. Thus, the last posted price for the last 4 hours would be $11.70.

Therefore, based on the multi and significant advantages of this invention, in light of the disadvantages of the current internet trading and auction type methods, the new invention will change the way of internet trading positively, bringing a new spirit, excitement, fun and interesting practice.

It should be understood that the new invention is introduced here, accompanied by drawings, and thus illustrated by way of example. The entire text and numerous examples showing some versions of the process presented are not limited by nature, and do not intend to apply any limitations, in any way, on the concept, application, method, process and system to the presentation here. Therefore, it does apply on further, more, and additional and broad applications, methods, systems and processes.

BRIEF DESCRIPTION OF THE DRAWINGS

The invention presented here contains, in a way of example, information regarding the details and descriptions of the invention. Such information also includes some of the advantages of the present invention. Thus, the drawings presented here should be taken as a summary of the main elements of the process of this invention, with direct relations and conjunction with the enter text.

In addition, the drawings presented here do not include obvious elements known in the industry as part of such operation, such as steps for numerous documentations, web site and its instruments, programs and operation, stations, CRT, notices to vendors and buyers, and such and other administrative or professional software and hardware. Therefore, the preferred embodiments of the present invention are illustrated in the drawings, in a way of flow-charts diagrams.

Thus, the previously noted objects and advantages of the instant invention and further and more specific object and advantages will be apparent to those skilled in the art from the following details description of the invention, taken in conjunction with the drawings, in which.

DETAILED DESCRIPTION OF THE PREFERRED EMBODIMENTS

Figure 1:
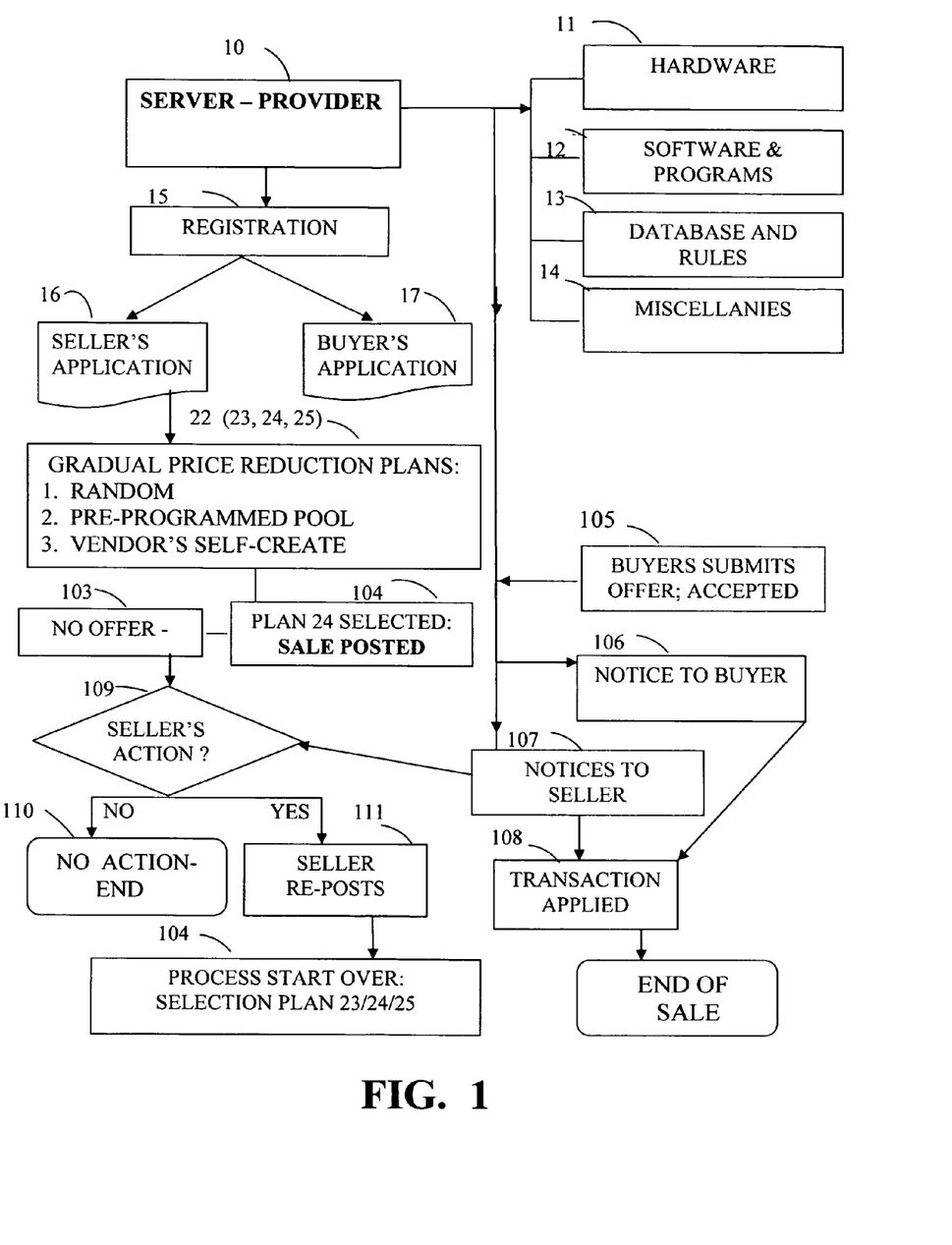
FIG. 1 is a flow chart diagram illustrating the major steps and parts of the overall process flow of the present embodiment, from the server to the end of a sale.

Turning now to the drawings in which like reference characters designate corresponding elements throughout the several views, attention is first directed to FIG. 1 in which is, by example, a general a flow chart illustrating the overall internet trading subject to this embodiment.

Starting with main server-provider station 10, 11, 12, 13, 14 represent some of the elements involved in operating such internet trading. In general, although not all listed in said FIG. 1, these may include, among others: A Computer system with all necessary software, hardware and numerous programs, a complete web site, the necessary data for all purposes, including for registration, maintaining database and trade information, various forms, maintenance forms, notices, applications, registrations forms, terms of use, user's help information, communications software, support section and instructions, feedback, contacts, and such and further elements needed to operate internet trading.

Thus, as examples, the FIG. 1 shows hardware 11, software and programs 12, which also includes the web site for the process, database and rules 13, and miscellaneous 14 are part of the server provider, whereby, as an example, software and program 13 also includes all sets if pre-programmed gradual price reduction, to be mentioned later in describing step 22 (23, 24, 25.)

The server-provider 10 having registration operation 15 via its web site included in 11, enabling seller 16 and buyer 17 to submit applications, as pre-registration, in order to participate in said server's internet trading business 10.

Upon submitting the applications 16, 17, seller 16 prepares to post a sale of goods or services by selecting a plan from 22, which represents the three (3) major pre-programmed sets-plans 23, 24, and 25. Upon selecting the appropriate plan, such as 24, it is instantly posted for sale. The plans will be discussed in FIG. 2. Note that any of the plans selected will start with the maximum, highest price for the goods or services as decided by the seller.

Thereafter, the pre-programmed set of gradual price reduction 24 changes the sale price posted for said good or service, whereby each time posted, the price is lowered by certain amount of money, or percentage, relative to the starting price, and each time lower than the last posted price, at any given time. For example, if a product was posted at $50, as the initial, highest price, sometimes later, per the automatic program of a specific set-plan selected 24, the price is reduced, e.g. to $42, which continues to be reduced per the plan 24, posted in 104.

Thus, at any given and real time, a prospective, pre-registered buyer 105 may submit an offer, which, for the purpose of this embodiment, also constitutes automatic purchase and acceptance. Thus, instantly, upon submission of an offer by buyer 105, a notice 106 to the buyer from the server 10 finalizes the sale and confirms the purchase. The buyer then follows transaction procedures 108.

On the other hand, note that should the sale ended without any offer 103, by the end of the duration of the sale, seller 16 will face a decision 109 specified below.

At that moment, and extremely instantly: the posted sale 104 is ended, and a notice 107 is sent to the seller for a few purposes, as step 109:
  a. To advise him or her that said product or service has been purchased;
  b. To enable the seller to contact the buyer to manage the transaction 109 of the purchase;
  c. To consider, his or her next step.

Accordingly, seller's action 109, which is also based on a 'no offer' 103 results either in termination with 'no action' 110, or by step 111, seller reposting the good or service, thereby starting the same again at 104—selecting either plan 22.

Said steps describe, in a short manner, the main steps of the process of the present embodiment. The following is a broader and more detailed description of the preferred embodiment.

Figure 2:
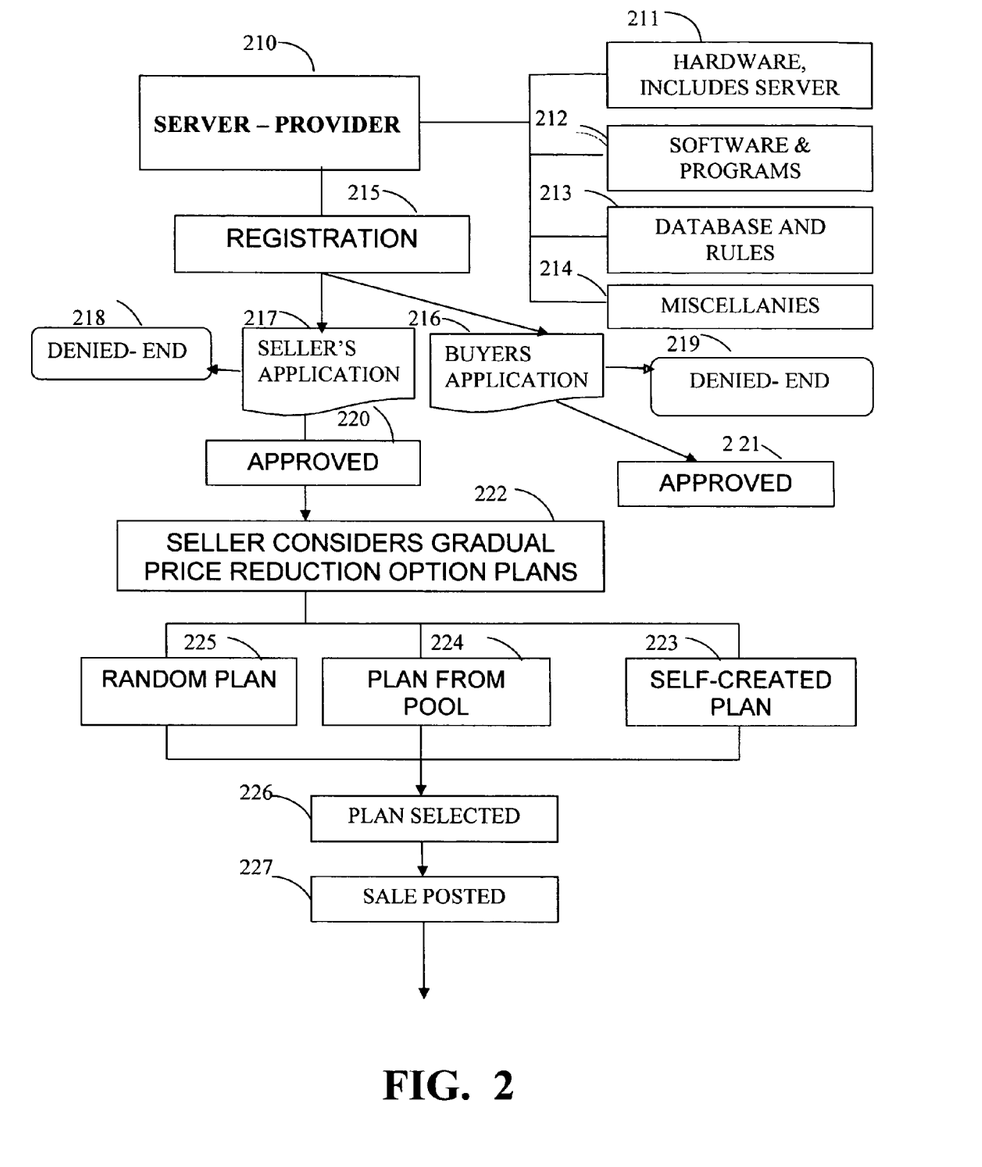
FIG. 2 which is a flow-chart diagram, showing several major steps of the first part of the process, from the Server step to the step of posted sale.

Referring now to FIG. 2, and based on the previous statements in this regard, it is necessary to note that while the description uses the drawings by the figures numbers, and by the references to most of the items on the flow charts, for easy following of the description, it is obvious that some references should be taken in the very broad definition. For example, the term 'miscellanies' may represent variety of applications, forms, messages to and from users, rules, terms, credit data storage, submission forms, details and photos of offers, and such other and further necessary elements to complete such internet auction operation.

In that, such will also make the reading of this invention simpler and most convenient.

Continuing with FIG. 2, it starts with the beginning of the process, showing the main server-provider 210, whereby many elements essential to operate such and other internet trading operation are represented by 211, 212, 213, and 214 as follows.

Hardware 211 is necessary for the operation of the program, whereby software and programs 212 includes all computer software and programs the entire process is based on, the server-provider 210 web site, and including the programs for the basic computer-server operation, programs for all parts of the operation, and registration applications, to name some. In addition, software and program 212 also contains all necessary gradual price reduction whereby each has a specific part below under 223, 224 and 225.

Continuing with the elements of the server 210, 213 represents database and rules for the entire operation, which also represent many possible applications, instructions and programs to accept the data, such as of buyers and sellers, and to maintain such. While the list of elements involved in such operation, although is obvious, is long, miscellanies 214 represents those elements, including, but not limited to forms, terms of use for buyers and sellers, storage of sales information, photos, communications, emails, notices, feedback, and such and further applications and elements.

Based on the hardware and software ready for operation, buyers and sellers use registration 215 in order to be able to participate in the internet trading to buy and/or sell goods and services. Thus, registration 215 enables 216, buyer's application, and 217, seller's application to be processed upon submission whereby they are approved or denied.

Thus, 218 is a denied seller's application, whereby it ends that seller's application being turned down. Similarly, 219 shows a denied application of a prospective buyer.

However, it should be understood that the buyer's registration may be at any time before, during or toward the end of the duration of a specific sale, or for future participation.

The system 10 is designed, however, to quickly, almost instantly upon completion of the information, to approve either prospective buyers or sellers. Indeed, 220 shows an approved prospective seller, and 221 shows an approved prospective buyer. At this point, the approved seller 217 may begin the process of posting a good or service for sale, at his convenience.

Selling goods or services starts with 222, as the sellers considers one of the three (3) major plans of gradual price reduction, which are 223, 224 and 225. The system 10 provides the appropriate information which is different in some ways from each other. Because of the importance of these plans (or programs), following is a broader and detailed description of these.

A. Plan 223, Self Created Plan is designed to enable the seller to select his own schedule set of gradual price reduction. As previously described in the summary, in this plans 223, the sellers enters basic data about the product or service for sale, including the maximum (highest) price the sellers wished to post at the beginning of the sale, and thereafter, the lowest price the sellers would accept. For example, the starting, maximum (highest) price for a computer printer is selected as $120, and the minimum price is selected as $65. For the purpose of this invention and example, the range of price reduction therefore is between $120 to $65 (=$55), known to the seller only.

Said amount of reduction is split, in sequence and frequency to be describe below, over the period of the duration of the sale, such as 3, 7, or 10 days, but which may be any period allowed by the internet trading provider.

Referring again to plan 223, Self-Created Set: the seller 217 creates his own set of gradual price reduction by entering the essential information, some of which is:

1. The maximum, highest price the seller wishes to begin the sale, which, eventually will be based on the seller's knowledge of the market, and his or her own judgment.
2. The minimum acceptable price the sellers wishes to end the sale with, knowing that the difference between the maximum, initially posted price and the minimum price to be posted at the end of the sale is the reduction range to be split over the period of the duration of the sale, as described above.
3. The units of amounts of money to be reduced over the period of the sale, each time, due to pre-selected and/or pre-programmed frequency. For example, one splitting the amount to be reduced equally every certain amounts of time, by a proper schedule to be selected, or smaller, larger, and different amounts in different times. (Note that example on this method have been provided earlier).
4. Frequency of price reduction: Based on the amount of money to be reduced, the sellers can select how often the price be reduced.
5. Percentage of the gradual reduction, which, in fact, the program will translate into amounts of money. This option is given as another example, and alternative method.

Still referring to plan 223, it should be mentioned again that the gradual price reduction is based on units of time, money and percentage, as they are defined again here for convenience.

i. Time: This includes any amount of time, including a fraction of an hour (minutes), hour, hours, day or days, or any combination of any of these.
   ii. Money: Including any fraction of a dollar, dollars, or any combination of any amount of money.
   iii. Percentage: Here, that is percentage from the initial posted price, thus eventually transferred into amount of money.

Still referring to seller 217 selecting (considering) plan 223, it should be understood that as soon as the seller selected his choices and entered the information, the program, in a click of a key, will calculate and generates, upon computer software developed for this purpose, a unique set of gradual price reduction for such sale.

Continuing with the second alternative plan of gradual price reduction to be selected by the seller prior to posting the sale, the second plan to be considered is as follows:

B. PLAN FROM POOL 224. This invention provides, among other programs and software, a pool of plans consist of at least one set of pre-programmed gradual price reduction, but preferably multi sets. Similar to the plan 223, the seller 217 selects a set for a sale from a pool of sets, thereby seller 217 just needs to click on one set of such plan. Note again that any of these sets are similar, in nature and principle, to the self-created plan 223, except that the units of money, time and percentages are different, whereby, based on the maximum and minimum price, the posted amount varies, respective to each product or service and its price, and so the frequency.

Thus, as soon as seller 217 selects the set from such pool 224, the system 210 will begin with posting the maximum initial price, and thereafter changing the price according to the set plan selected.

C. RANDOM PLAN. It is yet another option for seller 217 to select a plan of gradual price reduction randomly 225. In this simple plan, the systems 212 consists multi sets of gradual price reduction 225, each similar in nature to the sets described in Plan from Pool 224. All the seller 217 needs to do is click on "random' option 225, rather than select a plan or create one. That is designated as 226

Now, that the sellers 17 selected a plan from the three options 222, the selected plan, 226 is ready, and thus sale 227 is posted (at the maximum price pre-selected by the seller 217.)

While FIG. 2 ends with posting the sale, the remaining steps are described below for FIG. 3.

Figure 3:
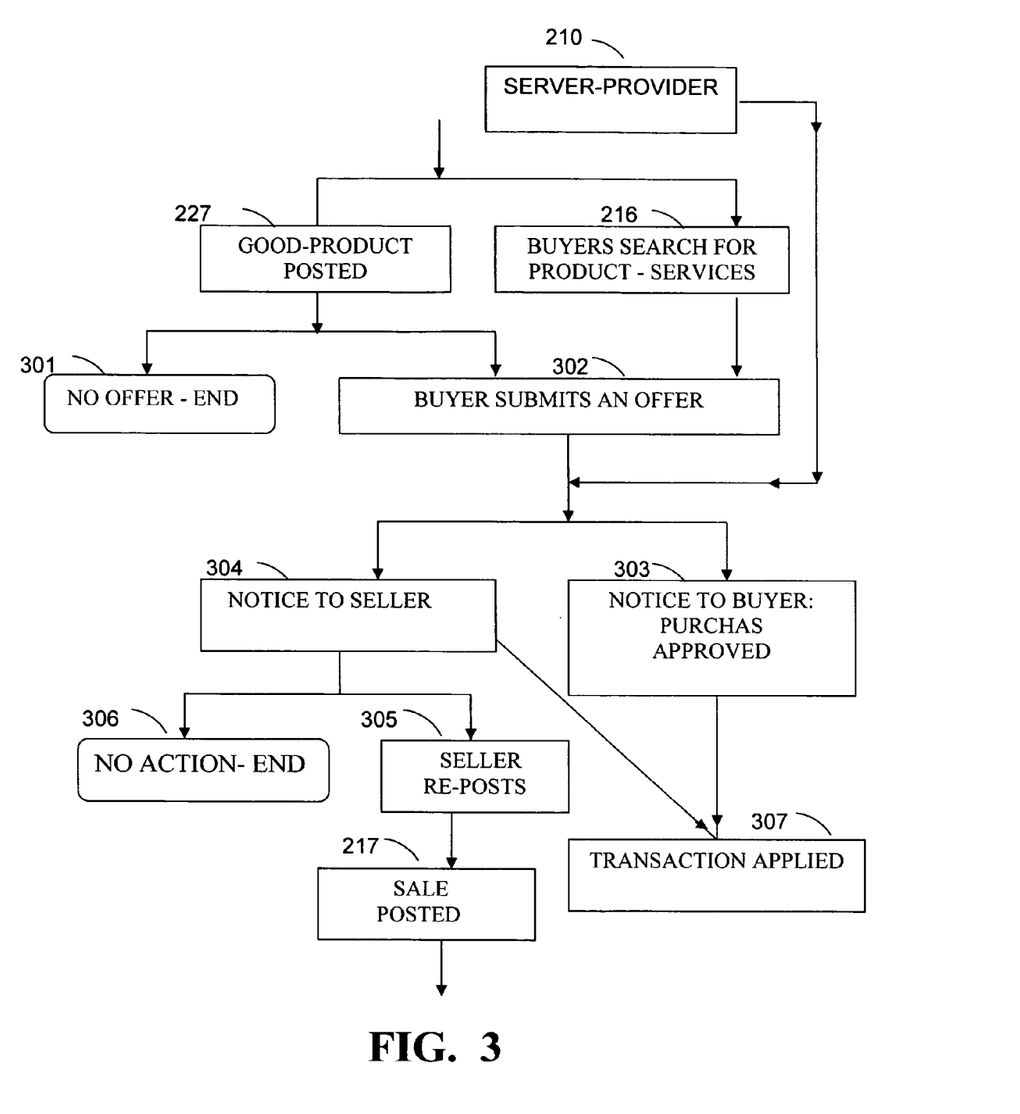
FIG. 3 which is a flow-chart diagram, showing several major steps of the second part of the process, continuing with the posting throughout the end of the sale.

Referring now to FIG. 3. which contains the rest of the major steps of this new invention, 227 is the posting. At any given time, a prospective buyer 216, who has been registered, or who may registered at any time before participating in this process, now searches for products or services at server-provider 210 web site.

When a buyer 216 finds a good or service, he or she wishes to 'grab' (purchase) it instantly, thus buyer submits an offer 302, which, for the purpose of this invention is, in fact, a purchasing notice. Therefore, instantly after the click of a key for submitting offer 302, server 210 received the offer and automatically confirms the purchase, in notice 303.

Not again that the fun and excitement of this invention is when the prospective buyer, and here, buyer 105 selects a satisfactory and attractive price from the gradual price reduction, without ever knowing the next lower price. Thus, in the buyer's 216 mind is that if he or she does not make a purchase at a given time, someone else may 'grab' (purchase) same product or service for a price modesty lower than the price buyer 216 sees on the screen at that moment. The idea is that the thinking would be "I may lose this opportunity for a few dollars or a few pennies . . . ".

Therefore, since the submission of offer 302 constitutes a purchase, server 210 then takes numerous actions, two of which are, by the way of example, sending a notice 303 to the buyer confirming the purchase, and advising him or her to complete the purchase. A second notice 304 is also instantly sent to the seller 217. The notice contains various information, including information of the buyer, details, contact and other necessary information to complete the transaction 307, which normally based on mutual commitment on both sides, the sellers and the buyers, according to their obligation based on the terms and rules previously discussed.

At that point, the seller 217, being encouraged by the sale, will decide between two choices: The seller 217 may reposts the same product or service in 305, or, for any reason, he or she may decide to end the sale in 305. Thus, while action (step) 306 ends the trade for said seller 217, step 305 starts the process for such trade of such product or service all over, as step 207 of FIG. 2.

Note that the description here has been given in a way of example, and that the embodiments are simply illustrated of the main principles of the invention, thus they do not limit the process presented herein, since numerous additional modifications, changes and additions may be made by skilled persons in the area of art, within the category of said principles, and which will embody those principles, falling within the spirit, concept and scope of this invention.

Having fully described and illustrated the present invention in such clear and concise terms so as to enable those skilled in the art to understand and practice the same, what is claimed is:

1. A computer-implemented method of conducting a sale on a sale site on the Internet comprising the sale-site computer-implemented steps of:
   a) receiving information regarding an item for sale on the sale site from a potential seller and posting the received information on the sale site;
   b) receiving a maximum buyout price and a minimum buyout price for the item for sale on the sale site from the potential seller;
   c) listing a starting buyout price amount for the item for sale on the sale site, the starting buyout price comprising the maximum buyout price;
   d) starting the sale on the sale site;
   e) the sale site periodically reducing the buyout price during the sale on the sale site between the maximum buyout price and the minimum buyout price for the item for sale on the sale site until a first offer from a first offeror on the item for sale is received on the sale site;
   f) in response to the first offer received on the sale site, the sale site automatically stopping the sale on the sale site and accepting the first offer on the item for sale on the sale site, regardless of whether the offer is the maximum buyout price, the minimum buyout price, or a buyout price between the maximum buyout price and the minimum buyout price; and
   g) informing the first offeror that the first offeror has won the sale on the sale site.

2. The method according to claim 1, wherein the step of the sale site periodically reducing the buyout price during the sale on the sale site between the maximum buyout price and the minimum buyout price for the item on the sale site further comprises the sale site periodically reducing the buyout price by random price reductions during the sale.

3. The method according to claim 1, wherein the step of the sale site periodically reducing the buyout price during the sale on the sale site between the maximum buyout price and the minimum buyout price for the item on the sale site further comprises the sale site periodically reducing the buyout price by pre-defined price reductions on the sale site during the sale.

4. The method according to claim 1, wherein the step of the sale site periodically reducing the buyout price during the sale on the sale site between the maximum buyout price and the minimum buyout price for the item on the sale site further comprises the sale site periodically reducing the buyout price by pre-programmed price reductions on the sale site during the sale.

5. The method according to claim 1, wherein the item is a product or service.

6. The method according to claim 1, further comprising the steps of:
   a) transferring funds from the first offeror to the seller; and
   b) verifying the transfer of the item sold to the first offeror.

7. A computer-implemented method of conducting a sale on a sale site on the Internet comprising the sale-site computer-implemented steps of:
   a) receiving information regarding an item for sale on the sale site from a potential seller and listing the received information on the sale site;
   b) receiving a maximum buyout price and a minimum buyout price for the item for sale on the sale site from the potential seller;
   c) receiving a price reduction plan on the sale site for the item for sale from the seller;
   d) listing a starting buyout price amount for the item for sale on the sale site, the starting buyout price comprising the maximum buyout price;
   e) starting the sale on the sale site;
   f) the sale site periodically reducing the buyout price during the sale on the sale site between the maximum buyout price and the minimum buyout price for the item for sale on the sale site until a first offer from a first offeror on the item for sale is received on the sale site;
   g) in response to the first offer on the sale site, the sale site automatically stopping the sale on the sale site and accepting the first offer on the item for sale on the sale site, regardless of whether the offer is the maximum buyout price, the minimum buyout price, or a buyout price between the maximum buyout price and the minimum buyout price;
   h) informing the first offeror that the first offeror has won the sale on the sale site.

8. The method according to claim 7, wherein the price reduction plan is a random price reduction plan set on the sale site, and the step of the sale site periodically reducing the buyout price during the sale on the sale site between the maximum buyout price and the minimum buyout price for the item on the sale site further comprises the sale site periodically reducing the buyout price by random price reductions on the sale site according to the random price reduction plan during the sale.

9. The method according to claim 8, wherein the random price reductions on the sale site comprise a set of random price reductions on the sale site from which the sale site randomly selects in the step of the sale site periodically reducing the price.

10. The method according to claim 7, wherein the price reduction plan is a pre-defined price reduction plan set on the sale site by the seller, and the step of the sale site periodically reducing the buyout price during the sale on the sale site between the maximum buyout price and the minimum buyout price for the item on the sale site by the sale site further comprises the sale site periodically reducing the buyout price by pre-defined price reductions on the sale site according to the pre-defined price reduction plan during the sale.

11. The method according to claim 10, wherein the pre-defined price reductions on the sale site comprise a pre-defined set of pre-defined price reductions on the sale site by the seller from which the sale site selects in the step of the sale site periodically reducing the price.

12. The method according to claim 7, wherein the price reduction plan is a pre-programmed price reduction plan on the sale site, and the step of the sale site periodically reducing the buyout price during the sale on the sale site between the maximum buyout price and the minimum buyout price for the item on the sale site further comprises the sale site periodically reducing the buyout price by pre-preprogrammed price reductions from preprogrammed price reductions on the sale site according to the pre-programmed price reduction plan during the sale.

13. The method according to claim 12, wherein the pre-programmed price reductions on the sale site comprise a set of pre-programmed price reductions on the sale site from which the sale site selects in the step of the sale site periodically reducing the price.

14. The method according to claim 7, wherein the item is a product or a service.

15. The method according to claim 7, further comprising the steps of:
   a) transferring funds from the first offeror to the seller; and
   b) verifying the transfer of the item sold to the first offeror.

16. A computer-implemented method of conducting a sale on an Internet sale site comprising the sale site computer-implemented steps of:
   a) receiving information regarding an item for sale on the sale site from a potential seller and posting the received information on the sale site;
   b) receiving a maximum buyout price and a minimum buyout price for the item for sale on the sale on the sale site from the potential seller;
   c) listing a starting buyout price amount for the item for sale on the sale site, the starting buyout price comprising the maximum buyout price;
   d) starting the sale on the sale site;
   e) the sale site periodically reducing the buyout price during the sale on the sale site between the maximum buyout price and the minimum buyout price for the item for sale on the sale site;
   f) repeating steps a) through e) until a first offer from a first offeror on the item for sale is received by the sale site or until said minimum buyout price has been posted for a predetermined period of time;
   g) stopping the sale on the sale site if no offer on the item for sale is received by the sale site after said minimum buyout price has been posted for the predetermined period of time;
   h) in response to receiving the first offer on the sale site, the sale site automatically stopping the sale on the sale site and accepting the first offer on the item for sale, regardless of whether the offer is the maximum buyout price, the minimum buyout price, or a buyout price between the maximum buyout price and the minimum buyout price;
   i) informing the first offeror that the first offeror has won the sale on the sale site.

17. The method according to claim 16, wherein the step of the sale site periodically reducing the buyout price during the sale on the sale site between the maximum buyout price and the minimum buyout price for the item on the sale site further comprises the sale periodically reducing the buyout price by random price reductions on the sale site during the sale.

18. The method according to claim 16, wherein the step of the sale site periodically reducing the buyout price during the sale on the sale site between the maximum buyout price and the minimum buyout price for the item on the sale site further comprises the sale site periodically reducing the buyout price by pre-defined price reductions on the sale site during the sale.

19. The method according to claim 16, wherein the step of the sale site periodically reducing the buyout price during the sale on the sale site between the maximum buyout price and the minimum buyout price for the item on the sale site further comprises the sale site periodically reducing the buyout price by pre-programmed price reductions on the sale site during the sale.

20. The method according to claim 16, wherein the item is a product or a service.

21. The method according to claim 16, further comprising the steps of:
   a) transferring funds from the first offeror to the seller; and
   b) verifying the transfer of the item sold to the first offeror.

* * * * *